United States Patent
Gardner et al.

(10) Patent No.: US 9,720,569 B2
(45) Date of Patent: Aug. 1, 2017

(54) CLOUD-BASED CUSTOM METRIC/TIMER DEFINITIONS AND REAL-TIME ANALYTICS OF MOBILE APPLICATIONS

(71) Applicant: SOASTA, Inc., Mountain View, CA (US)

(72) Inventors: Kenneth C. Gardner, Palo Alto, CA (US); Tal Broda, Sunnyvale, CA (US); Tana C. Jackson, Sunnyvale, CA (US); Matthew Solnit, San Jose, CA (US); Mukul Sharma, Sunnyvale, CA (US); Ben Bubenheim, San Francisco, CA (US); Kendall Cosby, Aurora, CO (US)

(73) Assignee: SOASTA, Inc., Mountain View, CA (US)

( * ) Notice: Subject to any disclaimer, the term of this patent is extended or adjusted under 35 U.S.C. 154(b) by 238 days.

(21) Appl. No.: 14/534,346

(22) Filed: Nov. 6, 2014

(65) Prior Publication Data
US 2015/0067527 A1    Mar. 5, 2015

Related U.S. Application Data

(63) Continuation-in-part of application No. 13/435,925, filed on Mar. 30, 2012, now Pat. No. 9,154,611.
(Continued)

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0488* (2013.01); *H04W 4/001* (2013.01); *H04W 4/003* (2013.01)

(58) Field of Classification Search
CPC ... H04L 12/2602; H04L 41/22; H04L 43/045; H04L 43/08; H04L 43/16; H04L 67/02;
(Continued)

(56) References Cited

U.S. PATENT DOCUMENTS

| | | | |
|---|---|---|---|
| 5,414,809 A | 5/1995 | Hogan et al. | |
| 5,615,347 A | 3/1997 | Davis et al. | |

(Continued)

OTHER PUBLICATIONS

Chester et al., "Mastering Excel 97", 1994, Sybex, 4th Ed., pp. 1016, 136-137, 430, 911, 957-958.
(Continued)

*Primary Examiner* — Claudia Dragoescu
(74) *Attorney, Agent, or Firm* — The Law Offices of Bradley J. Bereznak

(57) ABSTRACT

A method for real-time capture of analytics from real users of a native mobile application (app) includes storing a custom metric/timer definition for a native mobile application (app) in a configuration file on a server. The custom metric/timer definition includes one or more identifiers of an element or object of the native mobile app selected by touch gesture input via a user interface on a mobile device running the native mobile app in a special mode. The configuration file is downloaded from the server to real users running the native mobile app on associated mobile devices. Immediately thereafter, one or more collector servers receive data beaconed in real-time from the associated mobile devices of the real users. The beaconed data includes custom metric/timer data obtained from the custom metric/timer definition.

13 Claims, 11 Drawing Sheets

Related U.S. Application Data which is a continuation-in-part of application No. 12/927,426, filed on Nov. 15, 2010, now Pat. No. 8,306,195, which is a continuation of application No. 11/503,580, filed on Aug. 14, 2006, now Pat. No. 7,844,036.

(51) Int. Cl.
*H04W 4/00* (2009.01)
*G06F 3/0488* (2013.01)

(58) Field of Classification Search
CPC ............ G06F 17/248; G06F 17/30554; G06F 17/30864
See application file for complete search history.

(56) References Cited

U.S. PATENT DOCUMENTS

| | | | |
|---|---|---|---|
| 5,724,525 | A | 3/1998 | Beyers et al. |
| 5,945,986 | A | 8/1999 | Bargar et al. |
| 6,025,853 | A | 2/2000 | Baldwin |
| 6,092,043 | A | 7/2000 | Squires et al. |
| 6,134,582 | A | 10/2000 | Kennedy |
| 6,317,786 | B1 | 11/2001 | Yamane et al. |
| 6,434,513 | B1 | 8/2002 | Sherman et al. |
| 6,477,483 | B1 | 11/2002 | Scarlat et al. |
| 6,542,163 | B2 | 4/2003 | Gorbet et al. |
| 6,560,564 | B2 | 5/2003 | Scarlat et al. |
| 6,563,523 | B1 | 5/2003 | Suchocki et al. |
| 6,601,020 | B1 | 7/2003 | Myers |
| 6,738,933 | B2 | 5/2004 | Fraenkel et al. |
| 6,792,393 | B1 | 9/2004 | Farel et al. |
| 6,817,010 | B2 | 11/2004 | Aizenbud-Reshef et al. |
| 6,898,556 | B2 | 5/2005 | Smocha et al. |
| 6,959,013 | B1 | 10/2005 | Muller et al. |
| 6,975,963 | B2 | 12/2005 | Hamilton et al. |
| 7,050,056 | B2 | 5/2006 | Meyringer |
| 7,133,805 | B1 | 11/2006 | Dankenbring et al. |
| 7,216,168 | B2 | 5/2007 | Merriam |
| 7,334,162 | B1 | 2/2008 | Vakrat et al. |
| 7,376,902 | B2 | 5/2008 | Lueckhoff |
| 7,464,121 | B2 | 12/2008 | Barcia et al. |
| 7,478,035 | B1 | 1/2009 | Wrench et al. |
| 7,548,875 | B2 | 6/2009 | Mikkelsen et al. |
| 7,587,638 | B2 | 9/2009 | Shah et al. |
| 7,594,238 | B2 | 9/2009 | Takahashi |
| 7,607,169 | B1 | 10/2009 | Njemanze et al. |
| 7,617,201 | B1 | 11/2009 | Bedell et al. |
| 7,630,862 | B2 | 12/2009 | Glas et al. |
| 7,685,234 | B2 | 3/2010 | Gottfried |
| 7,689,455 | B2 | 3/2010 | Fligler et al. |
| 7,693,947 | B2 | 4/2010 | Judge et al. |
| 7,725,812 | B1 | 5/2010 | Balkus et al. |
| 7,743,128 | B2 | 6/2010 | Mullarkey |
| 7,757,175 | B2 | 7/2010 | Miller |
| 7,844,036 | B2 | 11/2010 | Gardner et al. |
| 7,965,643 | B1 | 6/2011 | Gilbert et al. |
| 8,015,327 | B1 | 9/2011 | Zahavi et al. |
| 8,060,581 | B2 | 11/2011 | Day et al. |
| 8,166,458 | B2 | 4/2012 | Li et al. |
| 8,291,079 | B1 | 10/2012 | Colton et al. |
| 8,306,195 | B2 | 11/2012 | Gardner et al. |
| 8,341,462 | B2 | 12/2012 | Broda et al. |
| 8,448,148 | B1 | 5/2013 | Kolawa et al. |
| 8,464,224 | B2 | 6/2013 | Dulip et al. |
| 8,479,122 | B2 | 7/2013 | Hotelling et al. |
| 8,510,600 | B2 | 8/2013 | Broda et al. |
| 8,583,777 | B1 | 11/2013 | Boyle et al. |
| 9,015,654 | B2 | 4/2015 | Kaasila et al. |
| 9,021,362 | B2 | 4/2015 | Broda et al. |
| 9,026,661 | B2 | 5/2015 | Swildens et al. |
| 9,154,611 | B1 | 10/2015 | Jackson et al. |
| 9,229,842 | B2 | 1/2016 | Broda et al. |
| 9,251,035 | B1 | 2/2016 | Vazac et al. |
| 9,384,121 | B2 | 7/2016 | Jackson et al. |
| 9,436,579 | B2 | 9/2016 | Broda et al. |
| 2002/0138226 | A1 | 9/2002 | Doane |
| 2002/0147937 | A1 | 10/2002 | Wolf |
| 2003/0074161 | A1 | 4/2003 | Smocha et al. |
| 2003/0074606 | A1 | 4/2003 | Boker |
| 2003/0109951 | A1 | 6/2003 | Hsiung et al. |
| 2003/0130982 | A1* | 7/2003 | Kasriel ............... G06F 17/3089 |
| 2003/0195960 | A1 | 10/2003 | Merriam |
| 2004/0010584 | A1 | 1/2004 | Peterson et al. |
| 2004/0039550 | A1 | 2/2004 | Myers |
| 2004/0059544 | A1 | 3/2004 | Smocha et al. |
| 2004/0064293 | A1 | 4/2004 | Hamilton et al. |
| 2004/0119713 | A1 | 6/2004 | Meyringer |
| 2004/0123320 | A1 | 6/2004 | Daily et al. |
| 2004/0205724 | A1 | 10/2004 | Mayberry |
| 2005/0027858 | A1 | 2/2005 | Sloth et al. |
| 2005/0102318 | A1 | 5/2005 | Odhner et al. |
| 2005/0182589 | A1 | 8/2005 | Smocha et al. |
| 2005/0216234 | A1 | 9/2005 | Glas et al. |
| 2005/0278458 | A1 | 12/2005 | Berger et al. |
| 2006/0031209 | A1 | 2/2006 | Ahlberg et al. |
| 2006/0075094 | A1 | 4/2006 | Wen et al. |
| 2006/0229931 | A1 | 10/2006 | Fligler et al. |
| 2006/0271700 | A1 | 11/2006 | Kawai et al. |
| 2007/0143306 | A1 | 6/2007 | Yang |
| 2007/0232237 | A1 | 10/2007 | Croak et al. |
| 2007/0282567 | A1 | 12/2007 | Dawson et al. |
| 2007/0283282 | A1 | 12/2007 | Bonfiglio et al. |
| 2007/0288205 | A1 | 12/2007 | Vazquez et al. |
| 2008/0049641 | A1* | 2/2008 | Edwards ............... H04L 12/66 370/253 |
| 2008/0059947 | A1 | 3/2008 | Anand et al. |
| 2008/0066009 | A1 | 3/2008 | Gardner et al. |
| 2008/0140347 | A1 | 6/2008 | Ramsey et al. |
| 2008/0147462 | A1 | 6/2008 | Muller |
| 2008/0189408 | A1 | 8/2008 | Cancel et al. |
| 2009/0077107 | A1 | 3/2009 | Scumniotales et al. |
| 2009/0271152 | A1 | 10/2009 | Barrett |
| 2009/0300423 | A1 | 12/2009 | Ferris |
| 2010/0023867 | A1 | 1/2010 | Coldiron et al. |
| 2010/0057935 | A1 | 3/2010 | Kawai et al. |
| 2010/0115496 | A1 | 5/2010 | Amichai |
| 2010/0198960 | A1 | 8/2010 | Kirschnick et al. |
| 2010/0250732 | A1 | 9/2010 | Bucknell |
| 2010/0251128 | A1 | 9/2010 | Cordasco |
| 2010/0333072 | A1 | 12/2010 | Dulip et al. |
| 2011/0066892 | A1 | 3/2011 | Gardner et al. |
| 2011/0119370 | A1 | 5/2011 | Huang et al. |
| 2011/0130205 | A1 | 6/2011 | Cho et al. |
| 2011/0191465 | A1* | 8/2011 | Hofstaedter ......... G06F 15/173 709/224 |
| 2011/0202517 | A1 | 8/2011 | Reddy et al. |
| 2011/0282642 | A1 | 11/2011 | Kruger et al. |
| 2012/0017165 | A1 | 1/2012 | Gardner et al. |
| 2012/0017210 | A1 | 1/2012 | Huggins et al. |
| 2012/0023429 | A1 | 1/2012 | Medhi |
| 2012/0101799 | A1 | 4/2012 | Fernandes |
| 2012/0166634 | A1 | 6/2012 | Baumback et al. |
| 2012/0246310 | A1 | 9/2012 | Broda et al. |
| 2012/0314616 | A1 | 12/2012 | Hong et al. |
| 2013/0031449 | A1 | 1/2013 | Griffiths et al. |
| 2013/0097307 | A1 | 4/2013 | Vazac et al. |
| 2013/0116976 | A1 | 5/2013 | Kanemasa et al. |
| 2013/0166634 | A1 | 6/2013 | Holland |
| 2014/0033055 | A1 | 1/2014 | Gardner et al. |
| 2014/0189320 | A1 | 7/2014 | Kuo |
| 2014/0280880 | A1 | 9/2014 | Tellis et al. |
| 2015/0067527 | A1 | 3/2015 | Gardner et al. |
| 2015/0095471 | A1* | 4/2015 | Singh ................... G06F 3/0482 709/221 |
| 2015/0319071 | A1 | 11/2015 | Kaasila et al. |

OTHER PUBLICATIONS

Malan et al. "An Extensible Probe Architecture for Network Protocol Performance Measurement", IEEE, Oct. 1998, pp. 215-227.
Jamin et al. "A Measurement-Based Admission Control Algorithm

(56) References Cited

OTHER PUBLICATIONS for Integrated Service Packet Networks", IEEE, 1997, pp. 56-70.
Dillenseger, "CLIF, a framework based on Fractal for flexible, distributed load testing" Nov. 18, 2008, Ann. Telecommun., 64:101-120.

\* cited by examiner

CLOUD-BASED CUSTOM METRIC/TIMER DEFINITIONS AND REAL-TIME ANALYTICS OF MOBILE APPLICATIONS

RELATED APPLICATIONS

This is a continuation-in-part (CIP) application of application Ser. No. 13/435,925 filed Mar. 30, 2012, now U.S. Pat. No. 9,154,611, which application is incorporated by reference herein in its entirety, and which application is a CIP of Ser. No. 12/927,426 filed Nov. 15, 2010, now U.S. Pat. No. 8,306,195, which is a continuation of Ser. No. 11/503,580 filed Aug. 14, 2006, now U.S. Pat. No. 7,844,036. The present application is also related to application Ser. No. 14/043,791 filed Oct. 1, 2013, now U.S. Pat. No. 9,450,834. Each of the aforementioned applications is assigned to the assignee of the present CIP application.

TECHNICAL FIELD

The present disclosure relates generally to cloud computing; more particularly, to automated systems and methods for gathering and analyzing real-time information of actual user experience using applications that run on mobile computing devices, as well as user experiences on websites.

BACKGROUND

In recent years there has been a huge proliferation of the number of mobile applications (commonly referred to as "apps") developed for devices such as smartphones, tablets and other mobile computing devices. For example, there are more than a million active mobile applications available in the marketplace for use on hundreds of millions of iOS (iPad, iPhone, etc.) and Android mobile platform devices. On a typical day it is estimated that upwards of 1,000 new apps are submitted to Apple's App Store.

There's no question that web and mobile application performance affects user behavior. Businesses and application owners are therefore interested in measuring real users' behavior and experience to understand how mobile application and web performance impacts their business. This has created a demand for Real User Monitoring (RUM) tools that capture and aggregate performance and engagement metrics for mobile applications and websites. Various tools and methods exist for collecting performance and business metrics from websites and web-based applications. For example, Boomerang is a piece of JavaScript that can be added to the bottom of a Web page, where it measures performance, e.g., page load time, and the like, and "beacons" (i.e., sends) the results back to a server.

A number of problems exist that make it difficult to quickly gather business metrics from a user of a native mobile application and websites. For instance, obtaining custom business metrics of a native mobile app typically requires that a software developer write special code (in Objective-C for an iOS app or Java for an Android app) that extracts and transmits one or more metrics of interest. This code is commonly included in a new version of the mobile app. The new version of the mobile app must then be submitted for approval to the App Store. Approval and release of the new version of the native app usually takes several weeks. Once the new version of the native app is available, existing app users must then update to the new version before metrics can be obtained from those users. At that point, the developer might detect an error or bug in the code that requires another iterative fix. In addition, by the time that metrics and performance data begins to flow to the analytics, the metric being measured might not be of interest anymore to the business or app owner due to a variety of reasons, e.g., changing market conditions.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION

Figure 1:
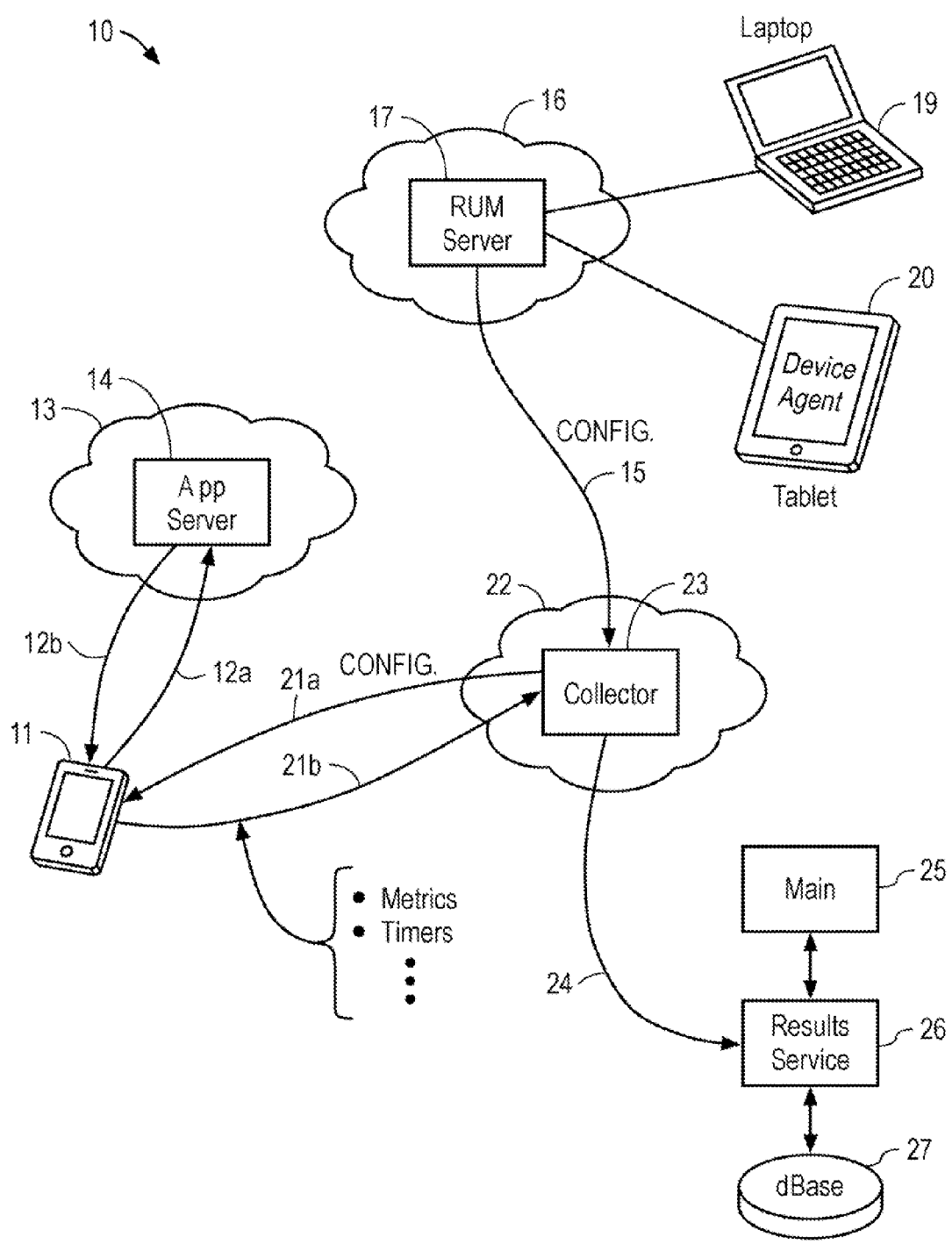
FIG. 1 is an example architectural diagram illustrating a computing platform that captures performance and business metrics and/or timers from real user measurements in accordance with one embodiment.

In the following description specific details are set forth, such as server types, cloud providers, structural features, process steps, etc., in order to provide a thorough understanding of the subject matter disclosed herein. However, persons having ordinary skill in the relevant arts will appreciate that these specific details may not be needed to practice the present invention. It should also be understood that the elements in the FIG.s are representational, and are not drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present application, the term "cloud" broadly refers to a collection of machine instances, storage and/or network devices that work together in concert. A "public cloud" refers to a cloud that is publically available, i.e., provided by a cloud provider that a user may access via the Internet in order to allocate cloud resources for the purpose of utilizing or deploying software programs, and also for running or executing those programs thereon. Some public clouds deliver cloud infrastructure services or Infrastructure as a Service (IaaS). By way of example, Amazon Elastic Compute Cloud (also known as "EC2™") is a web service that allows users to rent computers on which to run their own computer applications, thereby allowing scalable deployment of applications through which a user can create a virtual machine (commonly known as an "instance") containing any software desired.

Cloud platform services or "Platform as a Service (PaaS)" deliver a computing platform and/or solution stack as a service. An example PaaS cloud provider is the Google App Engine, which lets anyone build applications on Google's scalable infrastructure. Another leading software platform in the cloud provider is Microsoft Azure™, an application platform in the cloud that allows applications to be hosted and run at Microsoft datacenters. A "private cloud" is a cloud that is not generally available to the public, and which is typically located behind a firewall of a business. Thus, a private cloud is only available as a platform for users of that business who are behind the firewall.

The term "cloud computing" refers to a paradigm in which machine, storage, and application resources exist on a "cloud" of servers. In cloud computing shared resources, software and information are provided on-demand, like a public utility, via the Internet. Thus, cloud computing provides computation, data access, and storage resources without requiring users to know the location and other physical details of the computing infrastructure.

The term "server" broadly refers to any combination of hardware or software embodied in a computer (i.e., a machine "instance") designed to provide services to client devices or processes. A server therefore can refer to a computer that runs a server operating system from computer-executable code stored in a memory, and which is provided to the user as virtualized or non-virtualized server; it can also refer to any software or dedicated hardware capable of providing computing services.

In the context of the present disclosure, collector servers are servers deployed and used to receive real-user measurement data sent from a user's client device. Collector servers may also download configuration ("CONFIG") file information containing current metric and/or timer definitions to client devices responsive to polling requests sent by the client devices. Each collector server may process and aggregate the data items received. "Consolidators" are servers deployed and utilized in a hierarchical manner to accumulate and aggregate the data received from the collectors. The consolidators are typically configured to stream the further aggregated data to a ResultService Reader/Writer unit that stores a final aggregated set or array of data results in a database accessible to a computer or main instance that generates an analytic dashboard in real-time from the final aggregated set or array of data results.

The term "real-time" refers to a level of computer responsiveness that a user senses as sufficiently immediate or that enables the computer to keep up with some external process (for example, to present visualizations of load test results as it constantly changes). Thus, real-time is a mode of computer operation in which the computer collects data, analyzes or computes with the data, reports (e.g., visually displays) and/or stores the results nearly simultaneously, i.e., within milliseconds or microseconds.

In the context of the present disclosure, a "mobile computing device" or "mobile device" (for short) refers to any one of a number of different portable electronic devices having a touch-sensitive display with a graphical user interface (GUI), one or more processors, memory and one or more modules, programs or sets of instructions for performing methods associated with the operations described herein. A mobile computing device typically runs on an operating system executed on one or more processors, and may also run one or more applications installed or resident in memory (e.g., firmware, RAM, EEPROM, etc.) In some embodiments, the mobile computing device may provide a plurality of functions including wireless communication, thereby allowing a user of the mobile device access data and information via connection to the Internet. Mobile computing devices include smartphones, tablet computers, wearable computers, ultra-mobile PCs, personal digital assistants, other hand-held devices, as well as other mobile computers (e.g., carputers) that have touch screen interfaces with wireless capabilities.

A mobile application, or "mobile app" for short, is a term used to describe a software or firmware program that runs on a mobile computing device. A mobile app may include any variety of application that runs or executes in real-time for playing a game, accessing a website, social media, engaging in commerce, watching a video, delivering news, data/information, providing services, etc.

A native mobile app is an application program that has been developed for user on a particular platform or device. Because a native app is built for a particular device and its operating system (OS), it has the ability to use device-specific hardware and software. This means that native apps can take advantage of the latest technology available on mobile devices, such as global positioning systems (GPS), camera, audio, motion-detection, and other features and systems. A native app is installed directly on a mobile device, with developers creating a separate app version for each different type of mobile device.

In the context of the present disclosure, the term "beacon" refers to data related to a users experience on a particular mobile app running on a mobile device, website or web application. For example, beacon data may be collected by a library or program running inside a mobile application that gathers metric and/or timer data. In the case of a mobile app, the data gathered may be based on definitions contained in a configuration ("CONFIG") file that is periodically downloaded to the mobile device running the mobile app. For example, every user who runs a particular mobile app on their mobile device may also automatically download a CONFIG file every few minutes that defines the various metrics and/or timers to be gathered and beaconed back to a server from the user's mobile device in real-time as the user runs or uses the mobile app. In the case of a website, the library may be a JavaScript library running on the browser of a client device. The beacon data may then be sent via Hypertext Transfer (or Transport) Protocol (HTTP), or some other protocol, to a server (i.e., a collector server). The server receiving the beacon data may aggregate that information along with similar data received from other users of the mobile app, website or web application.

In one embodiment, a cloud-based platform is provided that allows a business manager or other user to define key business metrics and/or timers for a native mobile application utilizing a graphical user interface (GUI) that accepts simple gesture input (e.g., touch-based). Within a matter of a few minutes, the definitions may be implemented on the mobile app running on devices around the globe. Custom business and performance metrics may be defined through the GUI without having to write code or wait for subsequent App Store approval. The definitions can take effect immediately for all active users of the particular mobile app, regardless of the version of the app that is running. That is, there is no need to have the user of the mobile device upgrade his or her version of the mobile app. The result is that a business enterprise can begin gathering data from all active users of the mobile world-wide just minutes after the metric or timer definition is created.

In another embodiment, the cloud-based platform enables presentation of metric/timer data gathered in real-time from real users of a native mobile app (or a website or web application) and graphically displayed in an analytical dashboard. In this manner, key metric data can be compared visually with the general performance of the mobile app. For instance, a business metric such as the number of items added to a user's shopping cart can be graphically compared with a performance timer, such as how much time it took to load a particular image on a page of the mobile app, or the amount of time a user spent on a certain activity.

FIG. 1 is an example high level architectural diagram of a system 10 for definition of metrics and/or timers used to gather business and performance data from native mobile apps running on mobile computing devices (e.g., smartphones, tablets, etc.) around the world. In the embodiment shown, system 10 includes an App Server 14 shown in cloud 13 which is shown communicating with a smartphone 11. For example, the user of smartphone 11 may have just opened a mobile app that allows the user to shop at a particular clothing or department store, such as Macy's®, Nordstrom®, etc. When the user opens or runs the mobile app, smartphone 11 may send communications to the store's App Server 14 (arrow 12a) requesting various shopping pages, product offerings, latest sales, etc. That is, the various product offerings (which include image data and other page content) do not ship inside the app itself; rather, they are downloaded from App Server 14 (arrow 12b) to smartphone 11 in real-time in response to the user opening the app on his or her mobile device. Send/receive communications between App Server 14 and smartphone 11 are shown in FIG. 1 by arrows 12a & 12b.

Cloud 13, as well as clouds 16 & 22, shown in FIG. 1 may comprise an Internet Protocol (IP) network, such as the general public Internet, or an intranet private computer network confined to an organization that uses IP technology or a combination of private and public networks. Although FIG. 1 shows a single smartphone 11 communicating with App Server 14, it is appreciated that a wide variety of mobile devices located around the globe may be running a mobile app that communicates with server 14.

System 10 of FIG. 1 also includes a laptop computer 19 and tablet 20, which are shown communicating with a Real User Measurement (RUM) server 17 in cloud 16. Laptop 19 and tablet 20 may be used by a business manager or other user in a metric definition session that defines the various metrics/timers that will be used to gather data when real users run the mobile app on their respective mobile devices. It is appreciated that in other implementations, laptop computer 19 may comprise a desktop computer, workstation, personal computer, distributed computer system, etc., that provides a user interface that allows a user to access RUM server 17 to define the metric/timer measurements of the mobile app. The user interface may be web-based so it can be accessed from any computer having web-browser capabilities from any location in the world, without installation of specialized software. Server 17 may communicate with laptop 19 via a browser application running on laptop 19.

The metric/timer definitions may be stored in a CONFIG file in RUM server 17, which, in one embodiment, are sent to collector server 23 in cloud 22, as shown by arrow 15. It is appreciated that collection server 23 is representative of a plurality of collector servers 23 that may be distributed geographically around the world, all of which receive a copy of the CONFIG file. When a real user runs the particular mobile app of interest, the CONFIG file definitions are periodically downloaded to smartphone 11 from collector server 23 (as shown by arrow 21a), which then uses those definitions to gather metric/timer data that is subsequently sent (beaconed) to a collector server 23 in cloud 22, as shown by arrow 21b. Note that in one embodiment the most recent CONFIG file definitions may be periodically delivered (e.g., every 5 minutes) to smartphone 11 from collector server 23 responsive to a polling request sent from smartphone 11.

To define the custom metrics/timers for a particular mobile app a manager or other user of laptop 19 may launch, via RUM server 17, a special mobile device agent that will launch the app on a mobile device, e.g., tablet 20, that is available to the manager/user. The app is launched on tablet 20 in a special mode that allows the manager/user to record touch-based gesture inputs to tablet 20. The manager/user may exercise the mobile app on tablet 20, e.g., moving screen-to-screen, stopping at certain points to add a new custom metric or timer. For instance, a marketing manager at Nordstrom may want to know the value of each item placed in a user's shopping cart. By enabling a Touch Locator tool on the app, the manager may simply tap on the "Add to Shopping Cart" button or icon on a page of the mobile app, which brings in to view one or more identifier elements for that button or icon. Tapping on or selecting the appropriate identifier results in the custom metric being recorded into a CONFIG file for that particular app.

At the completion of the custom metric/timer definition session, all the changes to the CONFIG file are saved, with the CONFIG file then downloaded to all of the real users running the mobile app, thereby enabling immediate collection of beacon data from all of the real users running the app world-wide. Practitioners in the art will appreciate that Touch Locator feature provides the ability to define custom metrics/timers and validations without writing code. In the past, a programmer had to understand the complex view hierarchy (analogous to a web browser Document Object Model (DOM), which defines the logical structure of documents on a web page) and properties of the views (such as accessibility labels, classnames) in order to define a metric for a mobile app, sometimes requiring complex code (XPath). The Touch Locator feature of the disclosed system allows a relatively unsophisticated user to define an element or object in an app where a data value can be gathered and sent to a server 23 for collecting/aggregating the real-time test results.

It is appreciated that the information collected and periodically sent to server 23 may also include such performance metrics as web page load time, total load time, number of web pages accessed, average load time per page, etc. The specific metric/timer data collected and sent to server 23 may vary depending on the information of interest to the business or enterprise owning the mobile app or website. In addition, the periodicity or interval for sending the data collected may vary case-to-case. In one embodiment, custom business metrics and performance metrics, such as page load times and average load time, may be beaconed to collector server 23 on a predetermined time interval, e.g., every 100 ms.

It is appreciated that collector server 23 may receive beacons containing custom business metric/timer data and performance data from a multitude of different client devices, each of which may be located in a different geographic area. In other cases, server 23 may receive metrics and data from a multitude of different client devices located in the same geographic region (e.g., San Francisco). It is appreciated that a hierarchy of servers may be arranged to collect and consolidate data and metric/timer data and other performance data received from millions, or even billions, of mobile devices associated with real users running the same mobile app or accessing the same website or web application at the same time. In one embodiment, all of this data is sent to a Results Service (reader/writer) unit 26 that aggregates the total data received and stores it in a database 27, making it accessible to a main computer instance 25, which implements a real-time analytic dashboard for real-time visual presentation of the RUM results stored in database 27. It is appreciated that in other embodiments the aggregating unit may comprise another server(s), or other computing device (s).

Continuing with the example of FIG. 1, the application program running on main instance 25 operates to create a graphical user interface (GUI) that allows a user of laptop 19 to view/monitor the data in real-time, as well as modify the CONFIG file metric/timer definitions dynamically at any time. In the case of a website, as opposed to a native mobile app, the definition procedure results in Javascript code that is written on the website, which code takes effect immediately and enables the gathering of key metric/timer data from real users who access the website. In one embodiment, main instance 25 may be implemented in RUM server 17. Results service 26 may also be implemented in RUM server 17.

Figure 2:
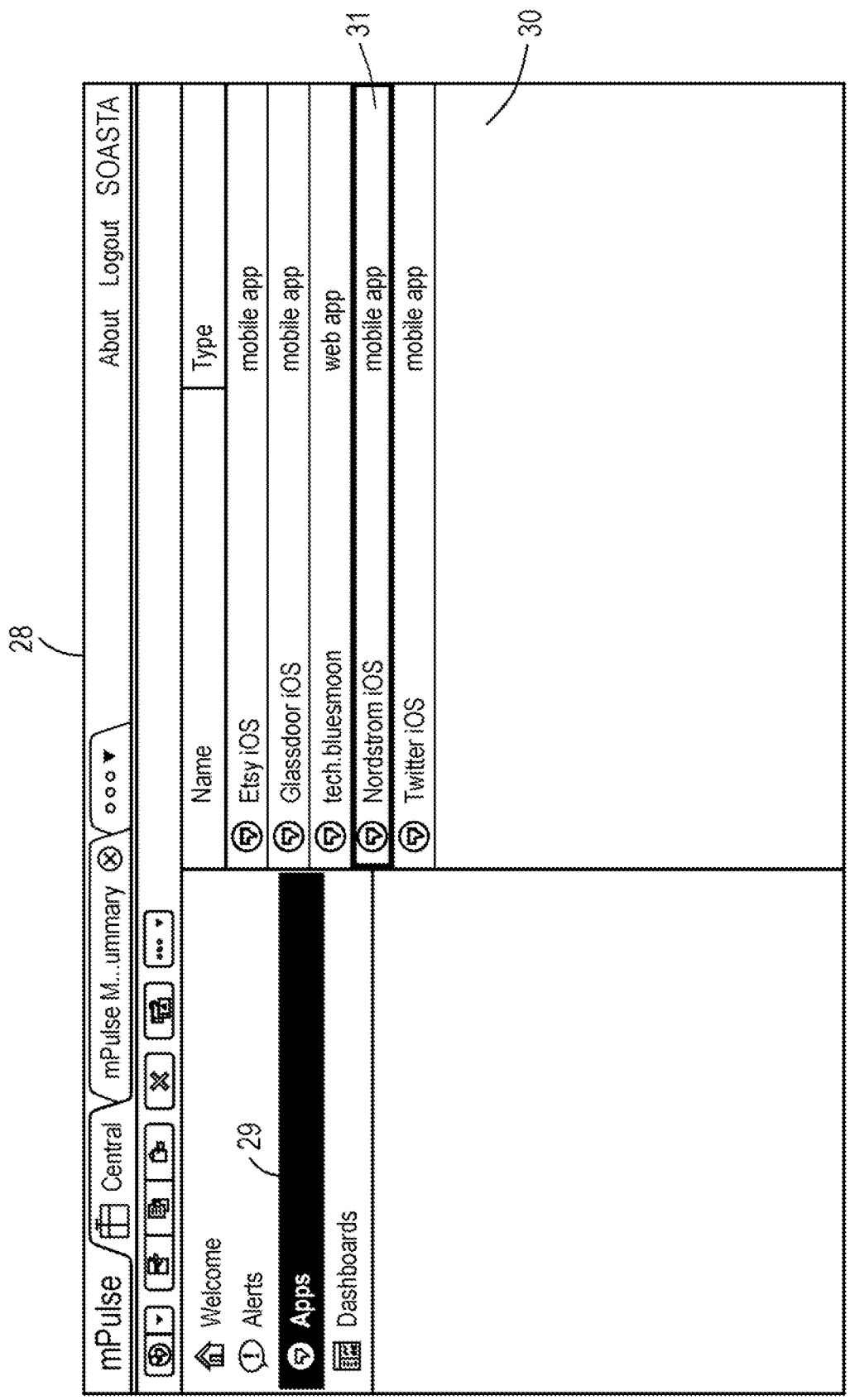
FIG. 2 is an example data analysis platform user interface window.

FIG. 2 is an example mPulse™ data analysis platform user interface (UI) window 28 that can be used to define custom metrics/timers for a native mobile app. Note that window 28 may be accessed from the web-browser capabilities of laptop 19 in communication with RUM server 17 and/or main instance 25 (see FIG. 1). As shown, window 28 also provides a user with access to an analytic dashboard for visualizing real-time information from RUM data captured, collected and aggregated from mobile apps running on various mobile devices around the world. In this example, "Apps" has been selected from a menu listing, as indicated by the highlighted Apps menu listing 29 on the left side of window 28. This selection produces a list of various mobile apps for the user to select from in field 30 on the right-hand side of window 28. In this case, the user has scrolled over the Nordstrom iOS mobile app, as shown by the highlighted Nordstrom iOS mobile app 31. In the embodiment shown, clicking on the Nordstrom iOS mobile app 31 launches a custom metric/timer definition session for that mobile app.

Figure 3:
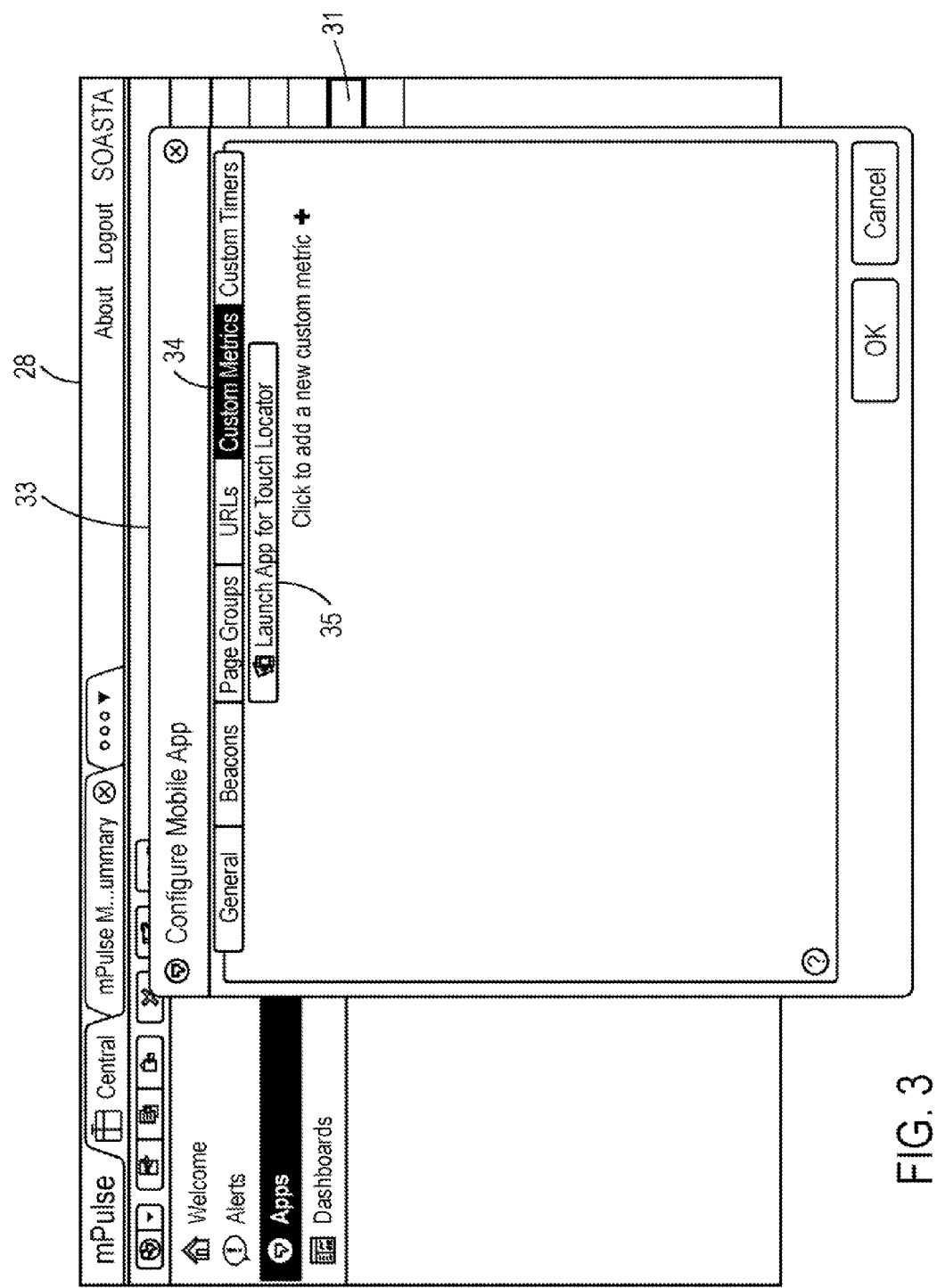
FIG. 3 shows another example user interface window for configuring a native mobile application to define/capture custom metrics and/or custom timers.

FIG. 3 shows an example user interface window 33 for configuring a native mobile application to capture custom metrics and/or custom timers. Window 33 appears on the user's browser screen in response to selecting or clicking on a particular mobile app, e.g., Nordstrom iOS mobile app 31, shown in FIG. 2. As shown, the user has selected the "Custom Metrics" tab 34, which produces a "Launch App for Touch Locator" button 35. Clicking on button 35 launches the Nordstrom iOS mobile app in a special device agent mode on the user's tablet 20 (e.g., iPad, iPhone, or other iOS compatible mobile device). In the device agent mode the user is able to record gesture (touch-based) user input on the display/touch screen of tablet 20. In other words, when in this special mode, any element or object that the user touches on the screen of tablet 20 brings up one or more identifiers or locators, which represents a path in the view hierarchy. Selecting one of the identifiers or locators allows the system automation to later find the particular element, grab its text or value, and send it to a collector server. Persons of skill in the art will appreciate that when the user touches an element or object while in the special device agent mode, a "TouchMetric" or "TouchTimer" for that element is automatically defined, which definition will then be dynamically deployed into the CONFIG file at the end of the definition session.

Figure 4:
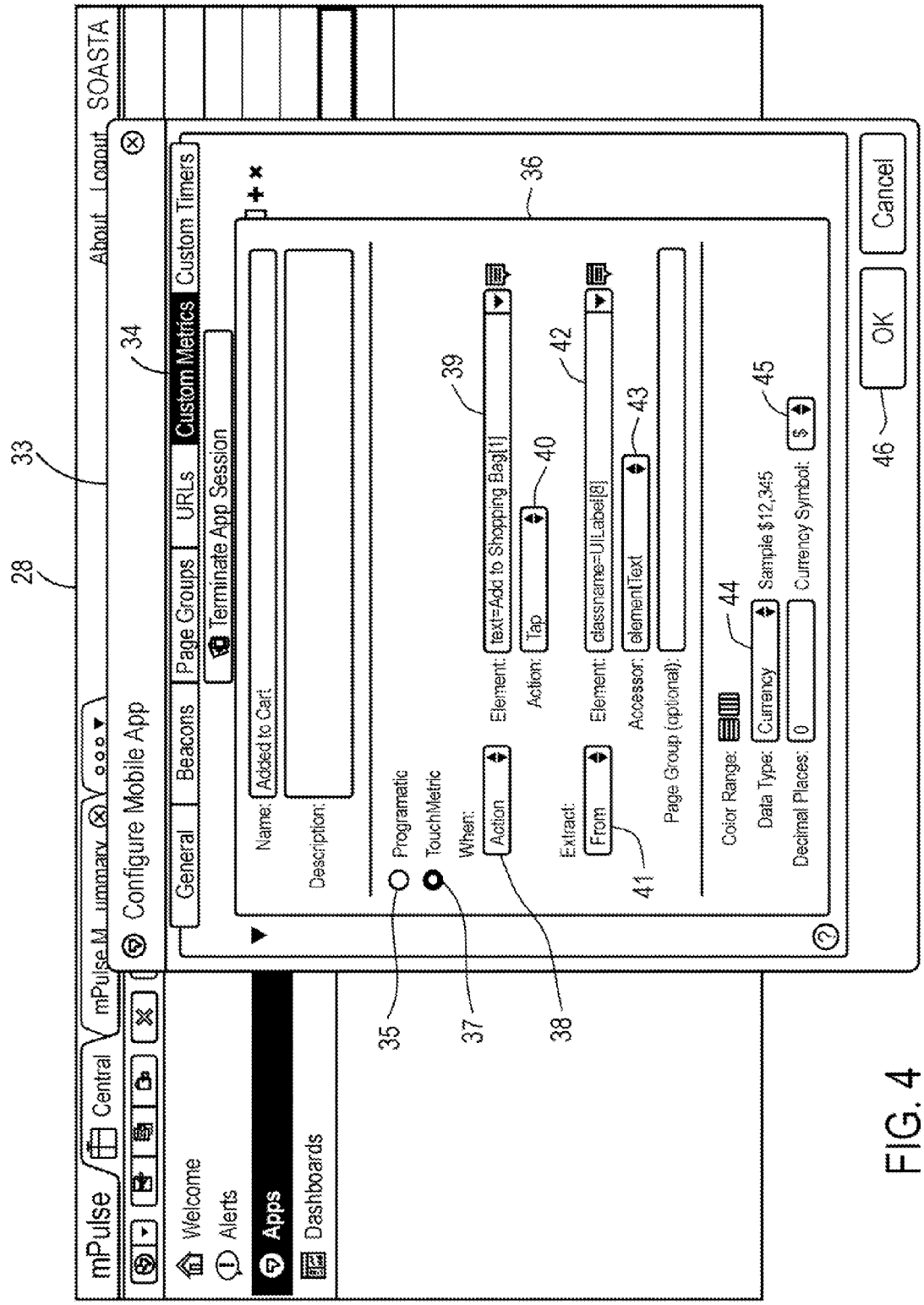
FIG. 4 is an example user interface window for defining a custom metric for a mobile application in a special device agent mode that allows touch-based location of various application element identifiers.

FIG. 4 is an example user interface window 36 for defining a new custom metric for a mobile application running on a mobile device in a special device agent mode that allows touch-based location of various application element identifiers. Window 36 appears in response to the user clicking on button 35 of FIG. 3. In this example, the user has decided to name the new custom metric "Added to Cart"; that is, when a real user of the mobile app adds some item into their shopping cart, the manager/user wants to automatically obtain the value of that item for business analytics purposes.

Note that in the embodiment of FIG. 4, the user may choose one of two options for defining the new custom metric: Programmatic (button 35) or TouchMetric (button 37). The programmatic option allows the user to write code to define the XPath of the element of interest in the view hierarchy, whereas the TouchMetric option enables the use of a TouchLocator tool that allows a user to define the custom metric simply by touching the element on the screen and selecting an appropriate identifier that automatically appears on the user's browser. In this example, the user has clicked on button 37 to select the TouchMetric option.

In the embodiment shown, the user can base the capturing of the data metric value on one of two different criteria: either an action or a condition, as selected in field 38. An action refers to when the real user actually does something, or takes some affirmative action, on the mobile app. For example, an action may include input such as hitting a button, a particular gesture-based input, or actively switching from one UI page to another. In the context of a video game app, an action may include executing any one of a variety of game commands or player inputs, or how many in-app purchases a game player is making.

A conditional criterion, on the other hand, means that something about the application state changes without user input or action. For instance, the app may change state after a certain period of time or inactivity, new animation may appear on the screen, or the app transitions to a new part of the user interface. In the example of FIG. 4, an action is specified in field 38, with the associated element (text=Add to Shopping Bag[1]) being shown in field 39. The particular action that triggers the capture of the value of interest is indicated in field 40, e.g., a "Tap" action of the real user.

User interface window 36 also includes various fields for defining the extraction of the data value of interest. For example, field 41 specifies that the value is to be extracted from the element (classname=UILabel[8]) identified in field 42. An accessor (elementText) is also indicated is filed 43. Field 44 allows the user to specify a data type (Currency) for the value of interest. Field 45 indicates the currency symbol ($). The decimal places and currency symbol assist in formatting the analytic dashboard.

As described, window 36 contains a definition of how the system will capture the new custom metric "Add to Shopping Cart", which includes the price of each item placed into a real user's shopping cart. In this example, the price is extracted when the user taps on the element identified in field 42. When the user clicks on "OK" button 46, the custom metric definition is saved into the CONFIG file. The next time (e.g., within 5 minutes) each of the mobile apps that are running world-wide check back with the server (either server 14 or 17 of FIG. 1) that mobile device will receive the new CONFIG file for that particular app and immediately start sending (beaconing) data gathered for the new metric to collector server 23. In one embodiment, clicking on button 46 also returns the user to the launching point (e.g., window 28) on the user's browser.

Practitioners in the art will appreciate that the definition/deployment procedures described above does not involve making any changes to the mobile app itself. The new CONFIG file is saved on the RUM server, which then gets transferred to all the collector servers located about the globe. The mobile app running on each real user's mobile device periodically polls a collector server to see if a new version of the CONFIG file is available. Note that according to this process no new code for the mobile app is written and no new version of the mobile app is deployed to change the metric definitions or analytics. Polling the server and downloading a new CONFIG file does not impact the performance of the mobile app. The CONFIG file tells the app what business metric/timer data to gather and beacon to the collector servers, which are independent from the App Server.

Similarly, in the case of websites, there is no need to make changes to the website in or to implement gathering of custom metric/timer information. Instead of a CONFIG file being downloaded to a mobile app, a JavaScript tag (e.g., Boomerang tag) may be dropped onto the website, which includes the custom metric/timer definitions, without any changes being made to the website.

Furthermore, there is no need for the business owner of the mobile app to wait for approval from the App Store before deploying the new custom metrics/timers for the app running worldwide on various mobile device types. Without writing any new code, a business manager can use the disclosed system and method to define and deploy new metrics/timers for gathering analytics in a matter of minutes.

Figure 5:
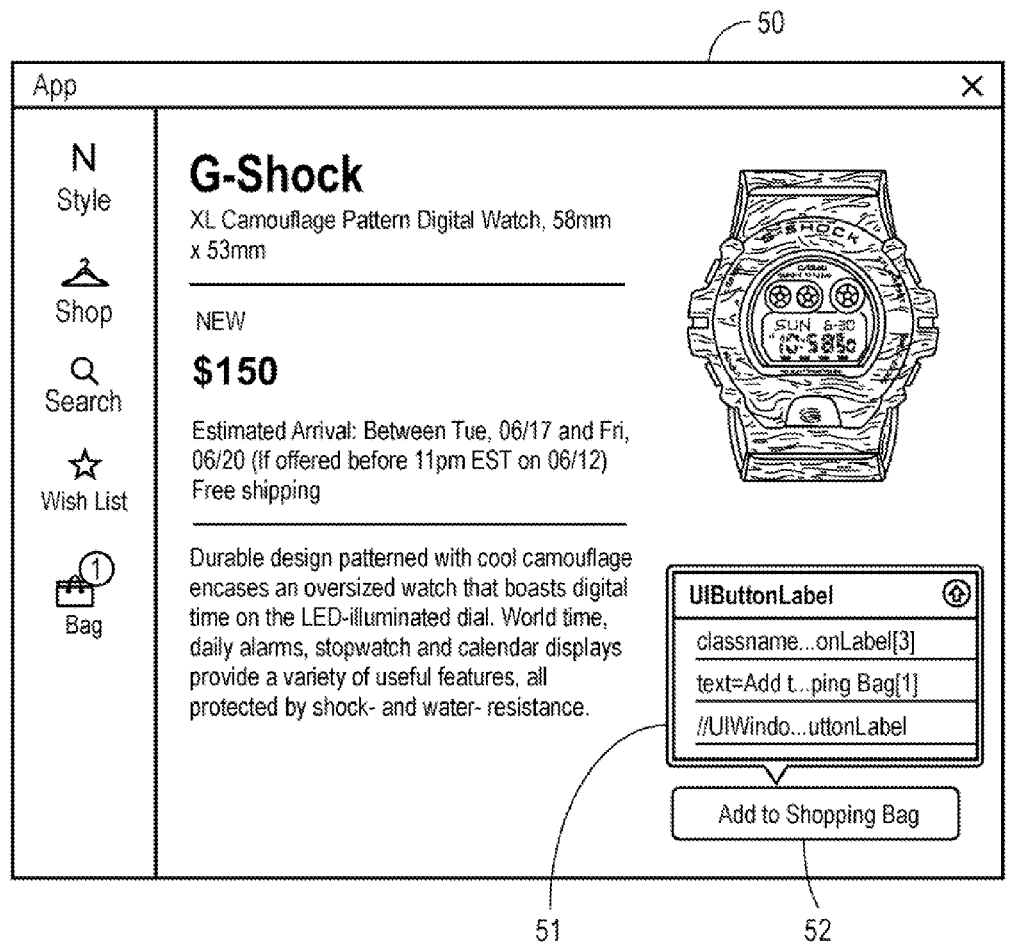
FIG. 5 is an example user interface window showing a list of selectable identifiers for touch-based location of an element or object of a mobile app.

Another advantage of the disclosed system and method is that the user interface allows an unsophisticated user to identify an element for a new metric/timer simply by running the mobile app in a special device agent mode and touching the element of interest. For instance, a business user may get to a point on the screen of a mobile app where an item may be placed into the shopping cart. As shown in FIG. 5, when the user taps on the "Add to Shopping Bag" button 52, a window 51 is automatically opened on window 50 (e.g., running on tablet 20). To define the new metric/timer the user may then select or click on the most appropriate identifier listed in window 51. Persons of skill in the art understand that the list of identifiers or locators are the different ways that the system can find the element, item or metric/timer value of interest.

Still another advantage is that as soon as the user saves the new custom metric/timer definitions, those definitions get deployed around the globe within a matter of minutes. Software agents running inside all of the mobile apps around the world periodically (e.g., every few minutes) check with the server to see if a new CONFIG file exists; if so, the new CONFIG file is downloaded to mobile app. Immediately thereafter, data gathered from the new metrics/timers is sent from all the real users running the app, regardless of the particular version of the app that a real user is running. This obviates the need to write code for a new version of the app, and then wait for approval of that app by the App Store.

Figure 6:
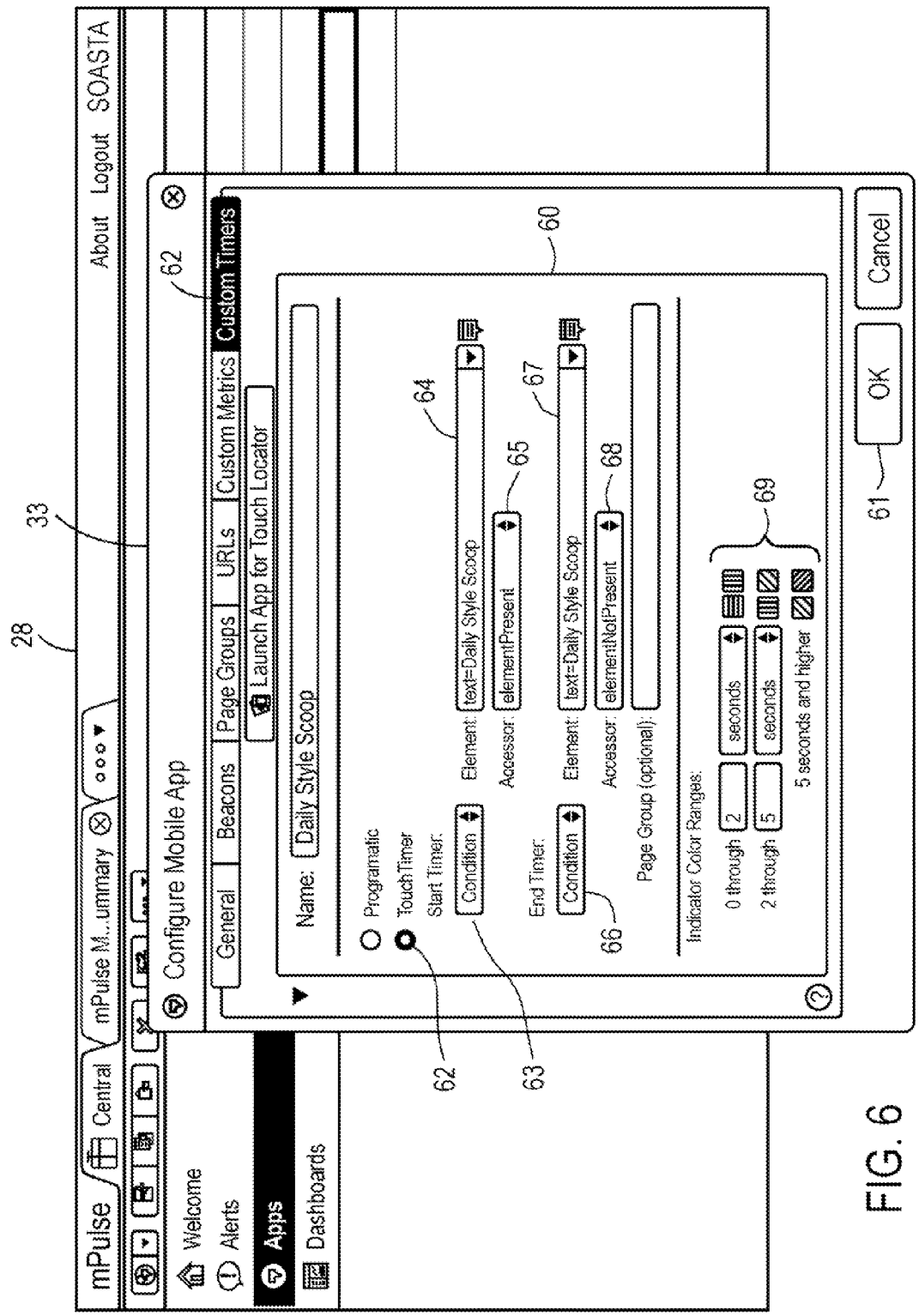
FIG. 6 is an example user interface window for defining a custom timer for a mobile application running on a mobile device in a special device agent mode.

FIG. 6 illustrates an example user interface window 60 for defining a new custom timer for a mobile application running on a mobile device in a special device agent mode. In this example, the user has selected the "Custom Timers" tab in UI window 33, which brings up window 60 on the user's browser screen. The user has clicked on TouchTimer button 62, which allows the user to use the TouchLocator feature discussed above to define Start Timer and End Timer criteria.

Figure 7:
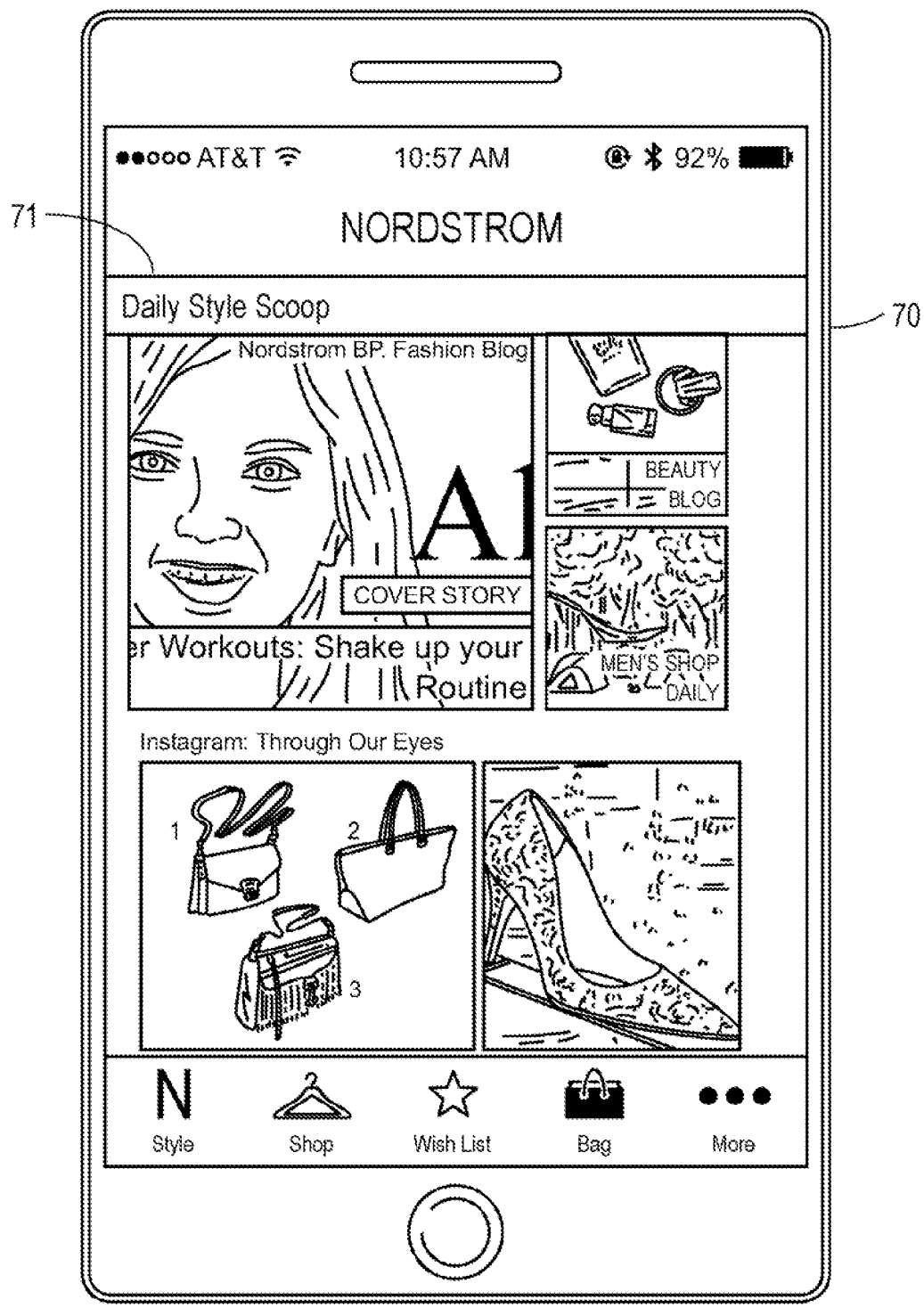
FIG. 7 illustrates an example native mobile application window running on a mobile device.

Note that instead of extracting a metric value, a custom timer involves choosing when to start and end a timer. In the example shown, the user wants to know how much time a real user spends viewing the Nordstrom home screen ("Daily Style Scoop") 71 of the Nordstrom mobile app running on their mobile device 71 (see FIG. 7). The Start Timer field 62 and the End Timer field 63 are both set to be triggered based on a condition of a particular element; namely, the "Daily Style Scoop" home screen, which is shown in both element fields 64 & 67. The accessor field 65 of the Start Timer definition is set to "elementPresent", and the accessor field 68 of the End Timer definition is set to "elementNotPresent". This means that the particular custom timer defined in window 60 starts when the home screen 71 first appears (loaded) on the screen of mobile device 70, and ends when the real user exits the home screen 71 (e.g., moves onto a different UI screen or page). In other words, once the app running on the mobile device detects that the element is present, the custom timer starts running, with the timer ending when the element is no longer present.

Persons of skill in the arts will appreciate that custom timers can be defined for a wide variety of mobile apps to measure a multitude of different real user behaviors. For instance, custom timers can be used to determine how long real users spend playing a particular level or mode of play on a video game, how long real users spend viewing profile information of other subscribers/members/players, or how long real users take to complete a particular type of business transaction (e.g., how long did they spend on a particular native mobile app before placing an item in their shopping cart). These types of business timers may be gathered and beaconed to collector servers in addition to standard performance timer data, e.g., load time (how long from the time that real user opened (started) an app on a mobile device until all of the pages finished loading). Both are supported natively in one embodiment.

The embodiment of FIG. 6 also includes color range indicator fields 69 that allow a user to define particular colors or shading for use in displaying different RUM timer value result ranges. These color definitions may carry through to the analytic dashboard to provide a quick visual indication of the custom timer of interest.

When the user completes the custom timer definition on UI window 60, he or she may click on "OK" button 61 to save the definition to the CONFIG file. Within minutes after clicking button 61, real user measurement data will begin to be collected from apps running world-wide. That RUM data analytics may be displayed in real-time on an analytic dashboard running on the business user's laptop or other computer device.

Figure 8:
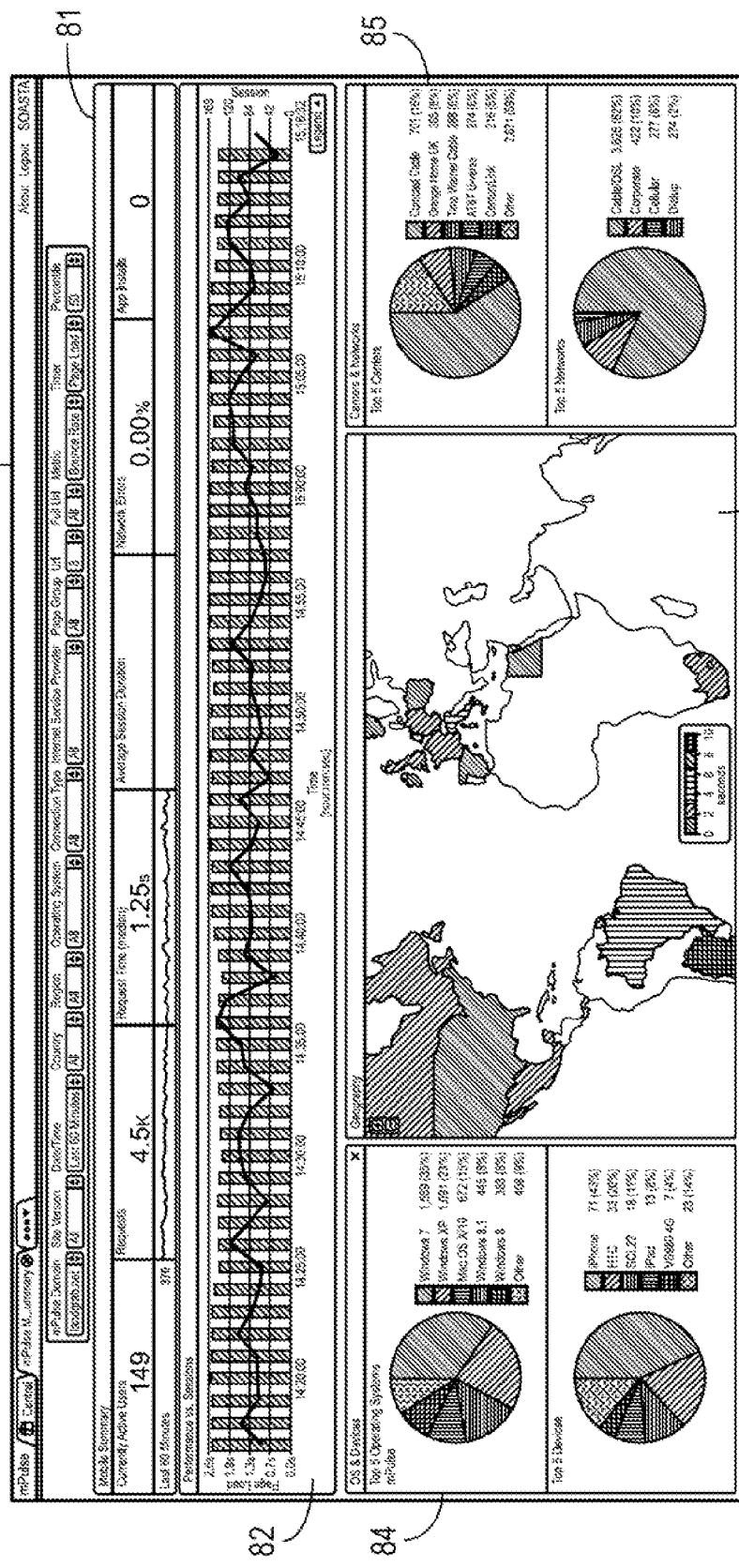
FIG. 8 is an example analytic platform dashboard window that delivers real-time visual information from RUM data.

FIG. 8 is an example analytic platform dashboard window 80 (GUI) that delivers real-time visual information from RUM data collected from devices around the world. Note that in this example, RUM analytics are displayed for real users' mobile client devices running a particular mobile app. It is appreciated that similar RUM analytics can be visualized in an analytic platform dashboard window for real users who are accessing a website or web application.

In this example, window 80 includes a field 81 that numerically shows summary information for real users running the mobile apps around the world. Note that field 81 indicates that 149 active users are currently running the mobile app of interest. The users have generated 4.5K requests, with the median request time being 1.25 seconds.

FIG. 8 also shows a widget or chart field 82 that visually indicates performance of the mobile app (page load time) versus the total number of sessions over time. It is appreciated that a wide variety of performance and custom business metrics/timers may be charted or graphed in field 82, with the data results being visualized in real-time for actual users distributed throughout the world. For instance, instead of displaying page load time, the user could select a custom business metric such as the total value ($) of items placed in users' shopping carts versus the number of sessions over time.

In the bottom center portion of window 80 is a geographic widget or display field 83 that visually shows the current performance metric of interest (page load time) for different geographic regions (countries) around the globe. By way of example, from the visual indicators shown, a user can quickly determine the performance of the mobile app in the USA (page load time <2 seconds) versus, say, Brazil (page load time ~4-6 seconds).

Additional analytics are also shown in data display fields 84 & 85, located to the left and right of field 83, respectively. Field 84 shows in pie-chart form the various operating systems (OS) and device types that are currently running the mobile app of interest. For example, the uppermost pie-chart shows the top five operating systems, i.e., Windows 7, Windows XP, Mac OS X/10, Windows 8.1, etc. The lowermost pie-chart in field 84 illustrates the top five device types, i.e., iPhone, HEC, SCL33, iPad, etc. Likewise, field 85 shows the top five carriers in the uppermost pie-chart and the top five networks in the lowermost pie-chart of field 85. Again, it should be understood that the data analytics displayed in the various GUI window fields or widgets is customizable, and may be changed by the user at any time. That is, in one embodiment the user may configure or select the number and type of widgets or fields to be displayed on the analytics dashboard at any given time.

Figure 9:
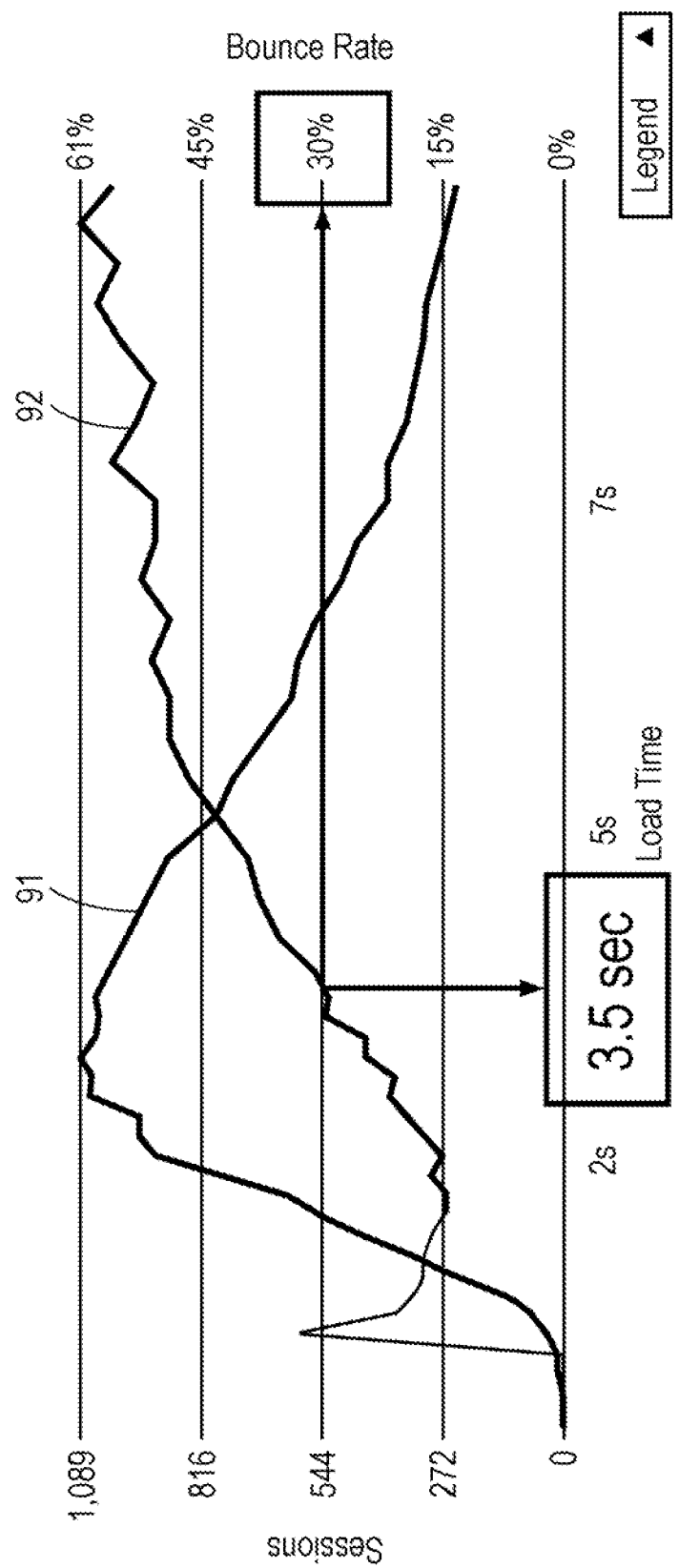
FIG. 9 is an example graph showing the intersection of business metric and performance data collected in real-time from real user measurements.

FIG. 9 is an example graph showing the intersection of business metric and performance data collected in real-time from all of the actual users currently accessing a website or running a mobile app. In the example of FIG. 9, line 91 plots the page load time performance of all real users of a mobile app or website as a function of the number of user sessions (left-hand side). As shown, the majority of user sessions experience load times in the range of about 1.5-5.5 seconds. In addition, the same graph also shows a line 92 which plots the Bounce Rate (right-hand side) versus load time. Bounce rate is business metric that refers to the percentage of users who access a website or open an app, and then leave very shortly thereafter. Line 92 clearly shows that the percentage of users who leave ("bounce") from the site or app increases as the load time increases. In other words, the graph of FIG. 9 shows that the slower the session, the more users bounce from the site or mobile app. A business user charting this information on an analytic dashboard can quickly determine the performance required to meet a certain acceptable or target bounce rate. For instance, as shown, if the business decides to target a bounce rate of 30% as an acceptable limit, they can quickly see that they need to provide a load time performance of 3.5 seconds or less.

Persons of skill in the art will understand that in accordance with the embodiments described herein, any business metric (e.g., bounce rate, revenue, item count, number of YouTube® "Likes", etc.) may be charted or graphed against any other metric or timer. It should also be understood that lines 91 and 92 may change shape and move over time, as the number of actual users change, or as their experience changes in real-time.

Figure 10:
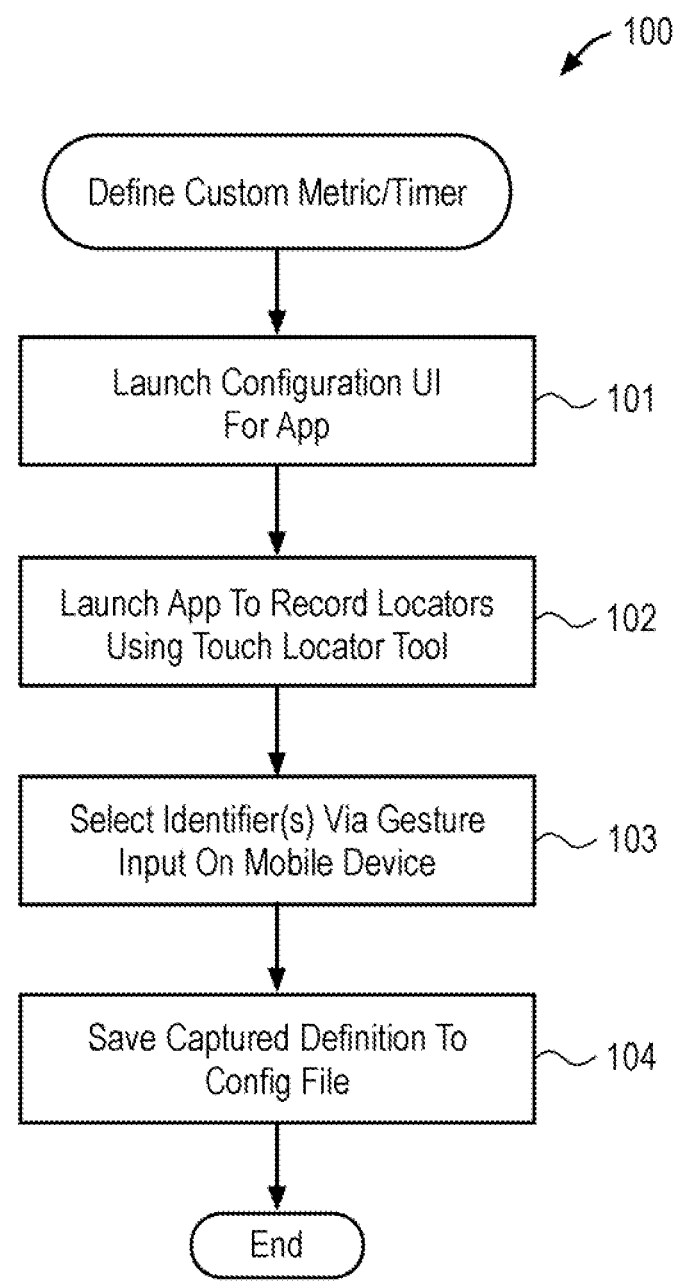
FIG. 10 is a flow diagram showing an example method for defining a custom metric/timer for a mobile application.

FIG. 10 a flow diagram showing an example method 100 for defining a custom metric/timer for a mobile application. The example sequence of steps begins with a business user launching a configuration user interface for the particular mobile app of interest (block 101). As previously discussed, the user may launch the configuration UI on a laptop or other computing device having normal browser capabilities for connecting with a server via the Internet.

The configuration UI for the mobile app allows the user to select a session for defining either a custom metric or a custom timer. After a selection has been made, the user may click or select on a button that launches the special mobile device agent on the user's mobile device. The device agent runs the mobile app in a special mode that allows the user to use a Touch Locator tool to record identifiers/locators via gesture inputs. (Block 102) For example, using the Touch Locator tool the user may simply tap on an element or object of the app which appears on the touch screen of the mobile device. Responsive to the tap gesture input, a window opens on the display screen, which lists one or more identifiers or locators for the selected element or object. The user may select one of the identifiers by tapping on the identifier or locator. (Block 103) The identifier or locator so selected is automatically saved to a CONFIG file which specifies the custom metric/timer definition for that particular mobile app. (Block 104)

After saving the CONFIG file to the server, the CONFIG file is subsequently downloaded to all of the mobile devices around the world that are currently running the particular mobile app, thereby enabling to mobile app to beacon data obtained from the custom metric/timer from the mobile device to a collector server.

Figure 11:
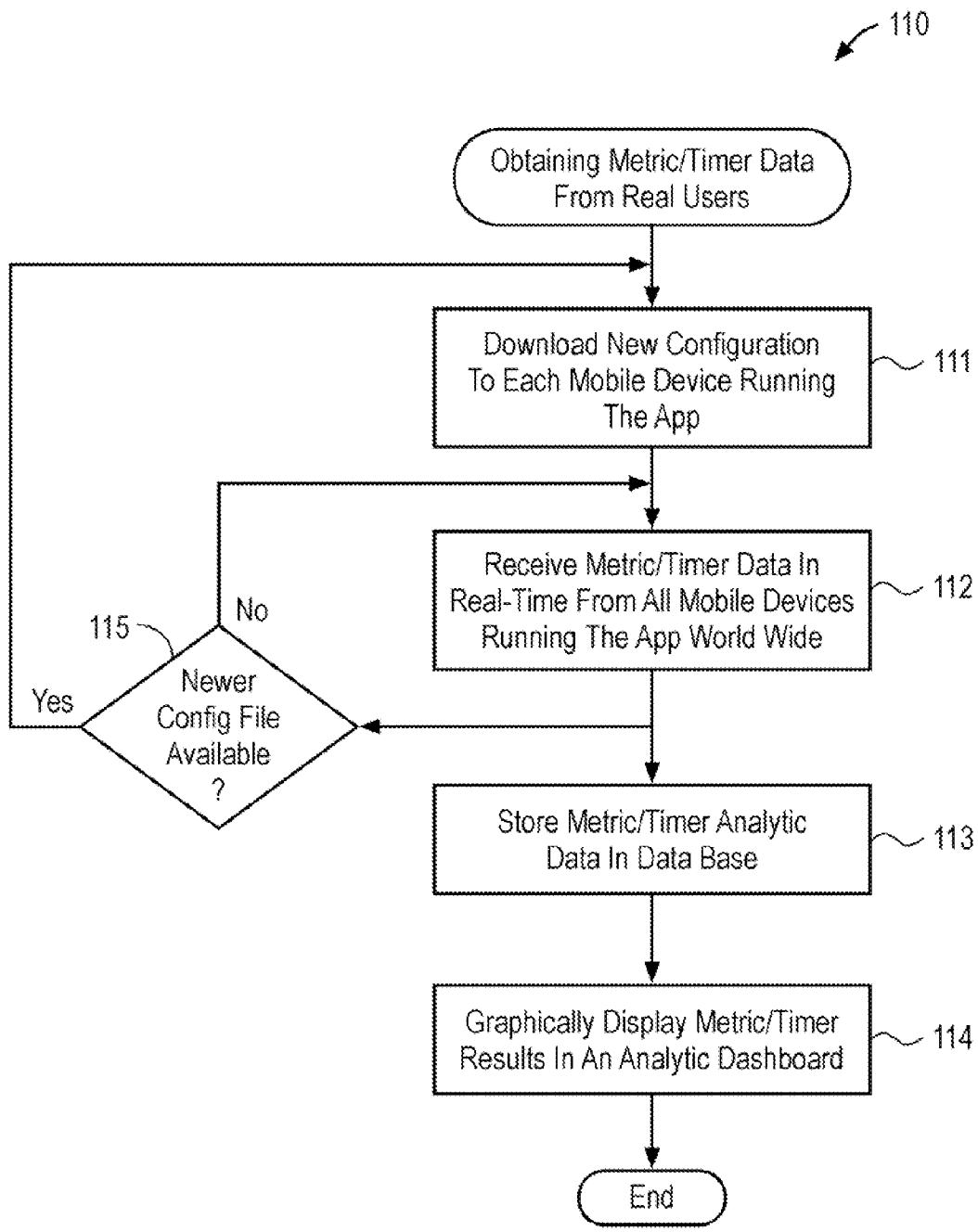
FIG. 11 is a flow diagram showing an example method for obtaining metric/timer data in real-time from real users running a mobile application.

FIG. 11 a flow diagram showing an example method 110 for obtaining metric/timer data in real-time from real users running a mobile application.

As discussed in conjunction with FIG. 10, after a custom metric/timer definition session has completed, the definition gets saved to a configuration (CONFIG) file that may contain a plurality of definitions, which may include business metric, business timer, and performance definitions for the mobile app. The mobile app is configured on each actual or real user's mobile device to periodically poll a server storing the CONFIG file. During the polling process, if it is determined that a newer version of the CONFIG file exists (decision block 115), the new CONFIG file is downloaded to the real user's mobile device and begins running within the mobile app. (Block 111) Once the CONFIG file has been downloaded, the mobile app commences gathering data in accordance with the metric/timer definitions. This analytical data is beaconed periodically from each real user's mobile device to one or more collector servers located about the world. (Block 112) The collected metric/timer analytic data is stored in real-time in a database (e.g., database 27 in FIG. 1). This is shown in FIG. 11 by block 113. The metric/timer analytic data may then be graphically displayed in real-time in an analytical dashboard. (Block 1124) In this manner, key metric/timer data can be compared visually with the general performance of the mobile app.

Note that while the mobile app is running and beaconing data obtained for the defined metrics/timers, it continues to periodically poll the server to query whether a newer version of the CONFIG file is available. This is shown in FIG. 11 by decision block 115. If no newer CONFIG file exists, the mobile app continues to beacon data gathered from the current definitions, which data is received by the one or more collector servers. (Block 112). If, on the other hand, a newer CONFIG file is available, that CONFIG file is downloaded to the mobile device running the app (block 111) and immediately is used to obtain the new metric/timer analytics.

It should be further understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware, firmware, and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method for real-time capture of analytics from real users of a native mobile application (app) comprising:
    storing a custom metric/timer definition for the native mobile app in a configuration file on a server, the custom metric/timer definition including one or more identifiers of an element or object of the native mobile app selected by touch gesture input via a user interface on a mobile device running the native mobile app in a special mode;
    downloading the configuration file to real users running the native mobile app on associated mobile devices,
    receiving, at one or more collector servers, data beaconed in real-time from the associated mobile devices of the real users, the beaconed data including custom metric/timer data obtained from the custom metric/timer definition, the custom metric/timer data including timer data obtained responsive to start timer and stop timer criteria, the downloading and receiving occurring without change to the native mobile app; and
    aggregating the data received at one or more collector servers in a database accessible to a computer that generates a real-time analytic dashboard that includes one or more visual indicators representative of the custom metric/timer data obtained, wherein the one or more visual indicators comprises an intersection of a business metric and a performance metric collected in real-time from all of the real users currently running the native mobile app, wherein the intersection includes a graphical chart of bounce rate as a function of load time.

2. The computer-implemented method of claim 1 wherein the downloading comprises:
    sending the configuration file from the server to the one or more collector servers; wherein the downloading of the configuration file is responsive to polling requests received from the associated mobile devices.

3. The computer-implemented method of claim 2 wherein each polling request is sent on a periodic basis.

4. The computer-implemented method of claim 1 further comprising launching a configuration user interface (UI) for the native mobile app on a computing device, the configuration UI allowing a business user to select a session for defining the custom metric/timer definition via the touch gesture input.

5. The computer-implemented method of claim 4 wherein the mobile device is associated with a business user, and further comprising launching, responsive to the session selection, a device agent which runs the native mobile app in the special mode on the mobile device, the device agent allowing the business user to use the touch gesture input to select the one or more identifiers of the element or object in the native mobile app which appears on a touch screen of the mobile device.

6. The computer-implemented method of claim 1 wherein the custom metric/timer data includes metric data obtained responsive to an action input received on the associated mobile device of the real user.

7. A non-transitory computer-readable storage medium encoded with computer instructions, which, when executed by one or more processors, operable to:
    store a custom metric/timer definition for a native mobile application (app) in a configuration file on a server, the custom metric/timer definition including one or more identifiers of an element or object of the native mobile app selected by touch gesture input via a user interface on a mobile device running the native mobile app in a special mode;
    download the configuration file from the server to real users running the native mobile app on associated mobile devices, and, immediately thereafter,
    receive, at one or more collector servers, data beaconed in real-time from the associated mobile devices of the real users, the beaconed data including custom metric/timer data obtained from the custom metric/timer definition, the downloading and receiving occurring without any change to the native mobile app; and
    aggregate the data received at one or more collector servers in a database accessible to a computer that generates a real-time analytic dashboard that includes one or more visual indicators representative of the custom metric/timer data obtained, the one or more visual indicators comprises an intersection of a business metric and a performance metric collected in real-time from all of the real users currently running the native mobile app, wherein the intersection includes a graphical chart of bounce rate as a function of load time.

8. The non-transitory computer-readable storage medium of claim 7 wherein execution of the computer instructions is further operable to send the configuration file from the server to the one or more collector servers; wherein the download of the configuration file is responsive to polling requests received from the associated mobile devices.

9. The non-transitory computer-readable storage medium of claim 8 wherein each polling request is sent on a periodic basis.

10. The non-transitory computer-readable storage medium of claim 7 wherein execution of the computer instructions is further operable to launch a configuration user interface (UI) for the native mobile app on a computing device, the configuration UI allowing a business user to select a session for defining the custom metric/timer definition via the touch gesture input.

11. The non-transitory computer-readable storage medium of claim 10 wherein execution of the computer instructions is further operable to launch, responsive to the session selection, a device agent which runs the native mobile app in the special mode on the mobile device, the device agent allowing the business user to use the touch gesture input to select the one or more identifiers of the element or object in the native mobile app which appears on a touch screen of the mobile device.

12. The non-transitory computer-readable storage medium of claim 7 wherein the custom metric/timer data is obtained responsive to an action input received on the associated mobile device of the real user.

13. The non-transitory computer-readable storage medium of claim 7 wherein the custom metric/timer data is obtained responsive to a conditional change in an application state of the native mobile app.

\* \* \* \* \*